Dec. 11, 1951   J. D. GEISTWEIT   2,578,237
FISH NET HANGER
Filed Jan. 10, 1950

INVENTOR
John D. Geistweit

BY Christian R. Nielsen
ATTORNEY

Patented Dec. 11, 1951

2,578,237

UNITED STATES PATENT OFFICE 2,578,237

FISH NET HANGER

John D. Geistweit, Williamsport, Pa., assignor of one-third to Orrin H. Thomas, Williamsport, Pa.

Application January 10, 1950, Serial No. 137,853

2 Claims. (Cl. 224—5)

This invention relates to a hanger for fish nets and the like, and it consists in the constructions, arrangements and combinations herein described and claimed.

It is an object of the invention to provide a hanger device for a fish net which may be readily engaged upon the belt of a fisherman having means for releasably suspending the net so that the latter may be conveniently manipulated in landing a fish.

More specifically, it is an object of the invention to provide a belt-engaging base member having a medially located projecting stud for receiving a ring member fixed to the terminal end of the handle of the net, there being a spring member secured to the base plate by the stud, the spring having a free end overlying a portion of the head of the stud, the free end of the spring being slightly outwardly flared to permit the ring on the handle to pass freely between the head of the stud and the spring when presented thereagainst, said spring being readily flexed outwardly away from the stud by a slight lateral pull upon the handle of the fish net.

It is a still further object of the invention to provide a hanger for a fish net or other implements which is simple and of substantial construction that can be manufactured at a low cost.

A further object of the invention is the provision of a hanger for implements having a handle, in which but a slight addition to the handle is necessary for use with the hanger.

Additional objects, advantages and features of invention will be apparent from the following description considered in conjunction with the accompanying drawing, wherein, Figure 1 is a front elevation of the hanger showing the device in use, Figure 2 is a perspective view of the hanger, Figure 3 is an enlarged vertical section on the line 3—3 of Figure 1.

There is illustrated a hanger 10 consisting of a base plate 11, substantially rectangular in shape, the short vertical edges 12 of which are offset rearwardly of the base plate and being slotted as at 13, through which a belt 14 is threaded, as clearly shown in Figure 1.

The base plate 11 is formed with a medially located aperture 15 for securement of a support stud 16 as will presently be described. A spring plate 17 is positioned upon the front face of the base plate 11, the plate 17 being provided with an aperture 18 aligned with the aperture 15 of the base plate. The support stud 16 has an annular flat base 19 axially of which there is provided a projecting rivet 20 of a diameter to frictionally fit through the apertures 15 and 18. The end of the rivet 20 is peened so as to force the metal thereof down upon the back of the base plate 11 and thus secure the support stud 16 and plate 17 to the base plate 11. Thus the support stud 16 is disposed at right angles to the base plate. In order to further secure the plate 17, particularly against any rotative movement upon the rivet 20, the lower end 21 of the plate extends beyond the lower edge 22 of the base plate which is then bent to form a lip extending inwardly along the lower edge 22 as at 23 (see Figure 3).

The support 16 has a cylindrical body 24 of suitable length and inwardly of the end thereof, the body is circumferentially and outwardly curved as at 25 to define a head 26, the latter being formed with a forwardly tapering circumferential surface 27. The head 26 has a planiform front end portion 28, the purpose of which will be presently explained.

The spring plate 18 has a tongue portion 29 bent inwardly upon itself, of a length so as to contact the tapered surface 27 of the head 26, as best seen in Figure 3. The end of the tongue is outwardly curved as at 30 and is thus spaced a short distance from the planiform end 28 of the head 26.

In Figure 1, there is shown conventionally, a fishing net 31 having a handle 32 in the end of which there is secured an eyelet 33, which in turn mounts a split ring 34.

In use, with the hanger device mounted at a convenient position on the belt of a fisherman, and it is desired to suspend the net 31 from the hanger device, the fisherman presents the ring 34 to a position against the planiform end 28 and against the underside of the curved portion 30, as indicated in dotted lines in Figure 3, and by exerting a slight upward pressure upon the ring 34, the tongue portion 29 will be sprung outwardly away from the head 26, permitting the ring 34 to pass on to the body portion 24, the net being thus securely suspended from the device. When the net is required to land a fish, the handle 32 of the net is grasped and moved laterally outward so that the ring 34 rides over the surface 25, engaging the tongue 29 and moving the latter away from the head 26 permitting ready passage of the ring from the device. The net is then free to be manipulated in the customary manner.

While I have shown and described the device for use in suspending a fishing net from a belt, it should be understood that the hanger may be employed for suspending other devices, such as screw drivers, hammers and like devices.

I claim:

1. A fish net hanger comprising a base plate having rearwardly offset slotted end portions for reception of a belt worn by a person, said base plate having a medially positioned aperture, a spring plate on said base plate having an aperture aligned with the aperture of the base plate and further having a lip extending inwardly along the lower edge of the base plate, a support having a reduced end forming a rivet for engagement through the aligned apertures of the base and spring plate, the outer end of the rivet being peened to secure the stud and plates, said spring plate having a forwardly and downwardly recurved tongue of a length to engage a portion of the supporting stud, the terminal end of the tongue being curved away from the stud to permit entrance of a supporting ring of a fishing net handle.

2. The structure of claim 1 in which the supporting stud is circumferentially and outwardly curved inwardly of its end and said end having a forwardly tapering circumferential surface forming the contacting surface for the curved portion of the tongue.

JOHN D. GEISTWEIT.

REFERENCES CITED

The following references are of record in the file of this patent:

UNITED STATES PATENTS

| Number | Name | Date |
| --- | --- | --- |
| 487,044 | Ziegler | Nov. 29, 1892 |
| 844,707 | Barker | Feb. 19, 1907 |
| 1,025,520 | Douglass | May 7, 1912 |
| 1,573,239 | Gilliland | Feb. 16, 1926 |
| 1,578,157 | Miller | Mar. 23, 1926 |
| 2,212,756 | Stewart | Aug. 27, 1940 |
| 2,455,765 | Harvey | Dec. 7, 1948 |
| 2,469,978 | Mrozinski | May 10, 1949 |